United States Patent [19]

Eriksson

[11] Patent Number: 4,598,172
[45] Date of Patent: Jul. 1, 1986

[54] TELECOMMUNICATION TERMINAL

[75] Inventor: Erik A. Eriksson, Bandhagen, Sweden

[73] Assignee: Telefonaktiebolaget LM Ericsson, Stockholm, Sweden

[21] Appl. No.: 648,172

[22] PCT Filed: Jan. 13, 1984

[86] PCT No.: PCT/SE84/00008
§ 371 Date: Aug. 29, 1984
§ 102(e) Date: Aug. 29, 1984

[87] PCT Pub. No.: WO84/03015
PCT Pub. Date: Aug. 2, 1984

[30] Foreign Application Priority Data

Jan. 19, 1983 [SE] Sweden ............................ 8300257

[51] Int. Cl.⁴ ............................................. H04M 9/00
[52] U.S. Cl. ........................... 179/16 AA; 179/18 AF; 179/170 R; 179/81 R

[58] Field of Search ......... 179/18 AF, 18 AG, 18 C, 179/18 G, 18 EA, 99 R, 170 R, 16 AA, 16 F, 18 FA, 81 R, 18 E; 370/24

[56] References Cited

U.S. PATENT DOCUMENTS 4,173,714 11/1979 Bloch et al. .................... 179/99 R

FOREIGN PATENT DOCUMENTS 0004510 1/1979 Japan ........................... 179/18 AF
1437031 5/1976 United Kingdom .
1566913 5/1980 United Kingdom .......... 179/18 AF Primary Examiner—Gene Z. Rubinson
Assistant Examiner—R. Vaas
Attorney, Agent, or Firm—Roberts, Spiecens & Cohen

[57] ABSTRACT

Telecommunication terminal with automatic switching from 4-wire to 2-wire operation. The terminal is provided with a voltage sensing circuit (5) sensing the way in which DC voltage is fed to the terminal, and in repsonse therto controlling switches (8,11) which switch the terminal to prevailing operation conditions.

2 Claims, 2 Drawing Figures

TELE COMMUNICATION TERMINAL 1

TELE COMMUNICATION TERMINAL 1

VOLTAGE SENSING CKT.

TELECOMMUNICATION TERMINAL

TECHNICAL FIELD

The invention relates to a telecommunication terminal with automatic switching between 4-wire and 2-wire operation.

BACKGROUND ART

With the development of digital telephony and with the rapidly increasing need for data distribution between centres and terminals over telecommunication lines, the question of the choice of 4-wire or 2-wire telecommunication has become of immediate interest. 4-wire operation has the technical advantage that communication in different directions takes place in different wire pairs, while 2-wire operation has the economical advantage that telecommunication systems already installed, such as private automatic branch exchanges (PABX) can be utilized. In the 2-wire case, where the transmitter and receiver communicate over the same wire pair there are differences, inter alia for the frame structure, from what is applicable to the 4-wire case.

The final standard for digital telecommunication will probably be 4-wire operation. However, 2-wire operation will be necessary during a long transition period, since practically all terminal cabling is 2-wire at the present time. A great problem during the transition period will be to supply the market with both types of terminal. It will also be expensive to gradually change over from 2-wire terminals to 4-wire terminals. One way of solving this problem is to provide for using the same terminal in both systems of operation.

DISCLOSURE OF INVENTION

The basic concept of the invention is to provide automatic switching in a telecommunication terminal, including transmitter and receiver, between 4-wire and 2-wire operation by sensing the DC voltage condition of the connected lines. It will thus be possible to meet different demands in respect of 4-wire and 2-wire communication in one and the same terminal.

DESCRIPTION OF FIGURES

The invention will now be described in detail with reference to the accompanying drawing, where.

PREFERRED EMBODIMENT

Figure 1:
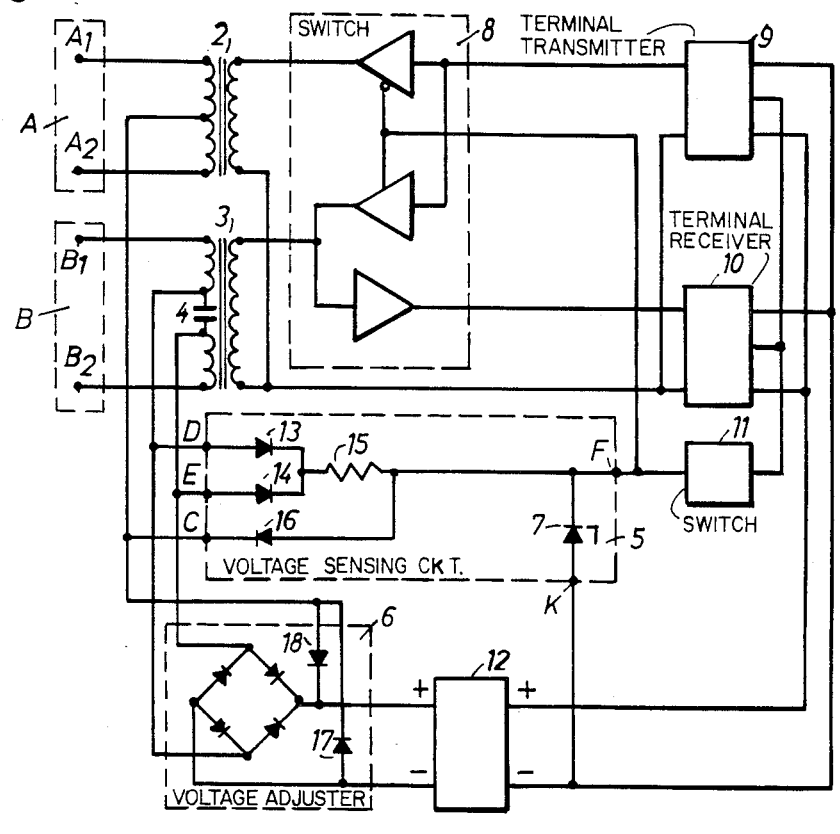
FIG. 1 illustrates a terminal with a voltage sensing circuit and switches.

FIG. 1 illustrates a telecommunication terminal 1 essentially for digital communication, and disposed such that it can be used for either 4-wire or 2-wire operation without recourse to manual action. The terminal, which has two input transformers 2 and 3, is in the 4-wire case, supplied with DC voltage, with the aid of circuitry (not shown). This means that a voltage of a given polarity is fed over the wire pair A to the transformer 2, while a voltage of the opposite polarity is fed over the wire pair B to the transformer 3. In the 2-wire case, DC voltage is fed over the wires in the wire pair B.

One of the following 4 conditions is applicable to the DC voltage feed:

$A_1 = +$; $A_2 = +$; $B_1 = -$; and $B_2 = -$
$A_1 = -$; $A_2 = -$; $B_1 = +$; and $B_2 = +$
$A_1 = 0$; $A_2 = 0$; $B_1 = +$; and $B_2 = -$
$A_1 = 0$; $A_2 = 0$; $B_1 = -$; and $B_2 = -$ Cases 1 and 2 correspond to 4-wire operation, while cases 3 and 4 correspond to 2-wire operation.

The terminal 1 is provided with a voltage sensing circuit 5 adapted such that it senses the incoming DC voltage, and in the 2-wire case sends a control voltage which actuates the switches 8 and 11 for switching the terminal from 4-wire to 2-wire operation.

The voltage sensing circuit 5 has three inputs, one input C connected to the center point on the primary winding of the transformer 2 and the other two inputs D and E connected across the center point capacitor 4 on the primary winding of the transformer 3. Via a diode 16 the input C is connected to the output F, while the inputs D and E are connected in parallel to the resistor 15 via the diodes 13 and 14, the other end of the resistor being connected to the output F.

According to the conditions above the following cases are possible:

(1) The diodes 13, 14 and 16 are blocked, the output F being given a minus potential via its load,
(2) The diodes 13, 14 and 16 are conductive and the output F is given a minus potential,
(3) The diode 13 is conductive while diode 14 is blocked. The diode 16 is without current as a result of the primary side of the transformer 2 being open, and the diode 17 in the DC voltage adjustment circuit 6 is blocked. The output F is given a plus potential which is determined by the Zener diode 7,
(4) The diode 14 is conductive while the diode 13 is blocked. The result will be the same as in case 3.

The control voltage obtained on the output F in cases 3 and 4 actuates the switch 8 such that the terminal transmitter 9, from being connected to the secondary winding on the transformer 2 is switched to the secondary winding on the transformer 3 in parallel with the receiver 10. The switch is of conventional type working with gates. The control voltage on the output F furthermore actuates the switch 11 such that it switches in or out components in the transmitter and receiver of the terminal to change the parameters which are affected by the transition from 4-wire to 2-wire operation. Examples of parameters which differ in the two operational cases are the frequency of the clock frequency oscillator and the frame structure of transmitter and receiver.

Figure 2:
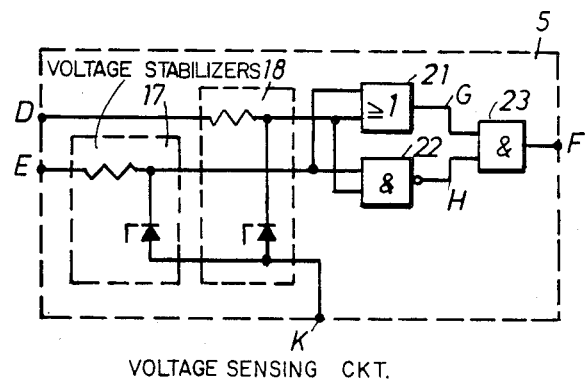
FIG. 2 illustrates an alternative voltage sensing circuit.

FIG. 2 illustrates another embodiment of the voltage sensing circuit 5, where a logical circuit is utilized. In this case the apparatus has two inputs D and E. These are connected via their voltage stabilizing circuits 17 and 18 to the parallel-connected inputs of an OR gate 21 and an inverting AND gate 22. The outputs from these gates are connected to the inputs of an AND gate 23.

In accordance with the previously mentioned DC voltage conditions there is obtained, if + represents the binary value 1, and − or 0 represents the binary value 0:

|     | $A_1$ | $A_2$ | $B_1$ | $B_2$ |
| --- | --- | --- | --- | --- |
| (1) | 1 | 1 | 0 | 0 |
| (2) | 0 | 0 | 1 | 1 |
| (3) | 0 | 0 | 1 | 0 |
| (4) | 0 | 0 | 0 | 1 |

Resulting from this the following cases apply to the two inputs D and E:

|     | $A_1$ | $A_2$ | $B_1$ | $B_2$ |
| --- | --- | --- | --- | --- |
| (D) | 0 | 1 | 1 | 0 |
| (E) | 0 | 1 | 0 | 1 |

For the output G at the OR gate 21:

|     | $A_1$ | $A_2$ | $B_1$ | $B_2$ |
| --- | --- | --- | --- | --- |
| (G) | 0 | 1 | 1 | 1 |

For the output H at the inverted AND gate 22:

|     | $A_1$ | $A_2$ | $B_1$ | $B_2$ |
| --- | --- | --- | --- | --- |
| (H) | 1 | 0 | 1 | 1 |

For the output F at the AND gate 23:

|     | $A_1$ | $A_2$ | $B_1$ | $B_2$ |
| --- | --- | --- | --- | --- |
| (F) | 0 | 0 | 1 | 1 |

This means that voltage sensing circuit's output F has a control voltage in cases 3 and 4, corresponding to 2-wire operation according to the conditions mentioned.

The control voltage is used in the same way as is accounted for in conjunction with the first embodiment. There are, of course, alternative circuit solutions for implementing the logical function described above, all of which are within the scope of the invention.

I claim:

1. In a telecommunication terminal including a transmitter and a receiver and having first and second sets of wire terminals connectable to telecommunication wires for four-wire operation and only said first set is used for two-wire operation, the kind of operation being determined by the value of DC voltages received by the wire terminals from the telecommunication wires, apparatus for controlling the telecommunication terminal to operate in four-wire operation or two-wire operation in accordance with the values of the DC voltages present at the wire terminals, said apparatus comprising first and second transformers each having a center-tapped primary winding connected to a different one of said sets of wire terminals and a secondary winding, a DC voltage sensing means having first and second inputs connected to the centertaps of said first and second transformers, respectively, said DC voltage sensing means generating first and second control signals in accordance with the levels of signals present at said first and second inputs and first switch means responsive to said first control signal for operatively connecting the transmitter to the secondary winding of said first transformer and the receiver to the secondary winding of said second transformer and being responsive to said second control signal for operatively connecting the transmitter and receiver only to the secondary winding of said first transformer.

2. The apparatus of claim 1 further comprising second switch means responsive to said first and second control signals for controlling the mode of operation of the transmitter and receiver.

* * * * *